United States Patent
McClung et al.

(10) Patent No.: US 7,684,364 B2
(45) Date of Patent: Mar. 23, 2010

(54) SYSTEM AND METHOD FOR PROVIDING A VIRTUAL LINE CHANNEL IN A PACKET BASED COMMUNICATION NETWORK

(75) Inventors: Michael Hugh McClung, Ruckersville, VA (US); Robert D. Corley, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 789 days.

(21) Appl. No.: 11/559,583

(22) Filed: Nov. 14, 2006

(65) Prior Publication Data

US 2008/0112398 A1    May 15, 2008

(51) Int. Cl.
*H04Q 7/00* (2006.01)
*H04L 12/28* (2006.01)
*H04B 7/212* (2006.01)

(52) U.S. Cl. .................. 370/329; 370/341; 370/356; 370/348

(58) Field of Classification Search ............. 370/329, 370/341, 348, 337, 352–357, 366, 367, 439, 370/513, 514; 379/93.07, 93.09, 93.11
See application file for complete search history.

(56) References Cited

U.S. PATENT DOCUMENTS

| | | | |
|---|---|---|---|
| 6,031,827 A * | 2/2000 | Rikkinen et al. | 370/330 |
| 6,141,341 A | 10/2000 | Jones et al. | |
| 6,333,931 B1 | 12/2001 | LaPier et al. | |
| 6,577,613 B1 * | 6/2003 | Ramanathan | 370/337 |
| 7,016,341 B2 | 3/2006 | Potter et al. | |
| 7,016,343 B1 | 3/2006 | Mermel et al. | |
| 7,126,941 B1 * | 10/2006 | Clemm et al. | 370/352 |
| 7,203,189 B2 | 4/2007 | Pinard et al. | |

* cited by examiner

*Primary Examiner*—Afsar M. Qureshi
(74) *Attorney, Agent, or Firm*—Baker Botts L.L.P.

(57) ABSTRACT

A method for implementing a virtual line channel in a packet switched network includes reserving a virtual line channel associated with a first station and establishing a communication session between the first station and a second station over the virtual line channel. The reservation of the virtual line channel is maintained while the communication session is active. The communication session may be transferred to a different channel associated with a third station. The reservation of the virtual line channel is maintained while the communication session is active despite the transfer of the communication session. When the communication session has terminated, the reservation of the virtual line channel is released.

30 Claims, 5 Drawing Sheets

SYSTEM AND METHOD FOR PROVIDING A VIRTUAL LINE CHANNEL IN A PACKET BASED COMMUNICATION NETWORK

TECHNICAL FIELD OF THE INVENTION

This invention relates in general to telecommunication processing and more particularly to a system and method for providing a virtual line channel in a packet based communication network.

BACKGROUND OF THE INVENTION

Historically, telecommunications have involved the transmission of voice and fax signals over a circuit switched network such as the Public Switched Telephone Network (PSTN) or the Public Switch Exchange (PBX). Likewise, data communications between computers have been historically transmitted over packet based networks using Internet Protocol (IP). Today, telecommunications and data transmissions have merged into an integrated communication network using technologies such as Voice over Internet Protocol (VoIP).

VoIP offers numerous advantages over a PSTN. For instance, VoIP increases user mobility as a user only needs a connection to the internet to enter into a communication session. Further, VoIP permits users in a shared line setting to barge into existing communication sessions and view details of communication sessions involving users of the shared line. VoIP also allows users to forward and/or transfer a call to a different line and clear the original communication line.

As new communication technologies become available, it is often difficult for users to assimilate the breadth of new features and functions. Despite the advantages offered by IP telephony, some features in circuit switched communication systems that users are accustomed to are not provided in VoIP implementations.

SUMMARY OF THE INVENTION

From the foregoing, it may be appreciated by those skilled in the art that a need has arisen for Internet Telephony (IP) telephony systems to possess similar functionality as an analog trunk in a circuit switched communication system. In accordance with the present invention, a system and method for providing a virtual line channel in a packet based communication network are described below that substantially eliminate or greatly reduce disadvantages and problems associated with conventional IP telephony techniques.

In accordance with a particular embodiment of the present invention, a method for implementing a virtual line channel in a packet switched network includes reserving a virtual line channel associated with a first station and establishing a communication session between the first station and a second station over the first channel. The reservation of the virtual line channel is maintained while the communication session is active. The communication session is transferred to a different channel associated with a third station. The reservation of the virtual line channel is maintained while the communication session is active despite the transfer of the communication session. When the communication session has terminated, the reservation of the virtual line channel is released.

In a particular embodiment of the present invention, the communication session is controlled using Session Initiation Protocol (SIP). Session Initiation Protocol may be used to maintain proxy states for the first station so that the virtual line channel can be implemented. Possible proxy states include Channel Active, Channel Inactive, Line Seized, and Line Seized—Channel Active.

In accordance with another embodiment of the present invention, a system for providing a virtual line channel in a packet switched network includes a IP telephone and a communication platform operably associated with the IP telephone. The communication platform is operable to reserve a virtual line channel for a communication session involving the first IP telephone and maintain the reservation while the communication session is active. If the communication session transferred to a different channel away from the IP telephone, the reservation of the virtual line channel is maintained while the communication session is active.

Technical advantages of particular embodiments of the present invention include an ability to emulate an analog trunk of a circuit switched network while using technology that operates in a packet switched environment. Accordingly, this enables the implementation of new technology without the expense of undue customer retraining. Such a feature is particularly advantageous in a small business environment.

Other technical advantages will be readily apparent to one skilled in the art from the following figures, descriptions and claims. Moreover, while specific advantages have been enumerated above, various embodiments may include all, some, or none of the enumerated advantages.

BRIEF DESCRIPTION OF THE DRAWINGS

To provide a more complete understanding of the present invention and the features and advantages thereof, reference is made to the following description, taken in conjunction with the accompanying drawings wherein like reference numbers represent like parts, in which.

DETAILED DESCRIPTION OF THE INVENTION

Figure 1:
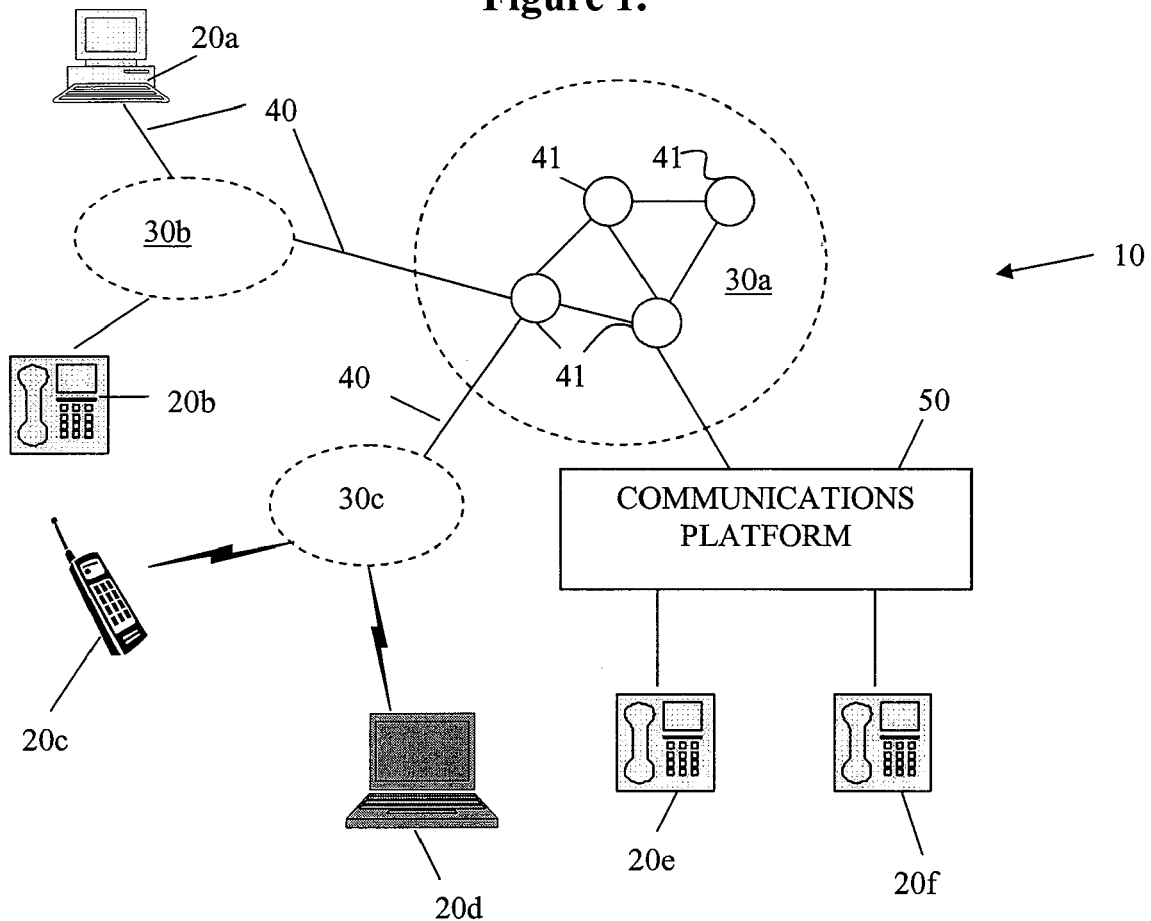
FIG. 1 illustrates a simplified block diagram of a communication system for providing a virtual line channel feature.

FIG. 1 illustrates a communication system 10 for communicating, receiving, and/or transmitting data. Communication system 10 includes a plurality of user stations 20a-f having the ability to establish communication sessions between each other using one or more of communication networks 30a-c. A communication platform 50 may have the ability to communicate control protocol signals with user stations 20a-f. The control protocols used may be any protocol used in establishing communication sessions between two or more user stations, such as session initiation protocol (SIP) or H.323. The control protocols facilitate establishing communication sessions using different forms of communication such as voice over Internet protocol (VoIP), video over IP, or any other form of communication that uses packets to transmit communication information from one user station to another. A communication session shall include the sending or receiving of any type of media transmitted using any audio, video, and/or data means through any suitable technology such as voice devices or instant messaging.

In accordance with the teachings of the present invention, communication platform 50 of communication system 10 is operable to establish a Virtual Line Channel (VLC) in a packet based network. The VLC allows users to interface with a packet switched network and provides features similar to a circuit switched network. More specifically, the VLC emulates a key telephone system to alter the functionality of an IP phone. One particular characteristic modeled by the VLC is that it will remain active as long as the original incoming call is active, even if the call is forwarded or transferred to a different line.

Although the illustrated embodiment includes three communication networks 30*a-c*, communication system 10 is intended to represent any number, type, size, or group of communication networks. Further, the term "communication network" should be interpreted as generally defining any network capable of transmitting audio and/or video telecommunication signals, data, and/or messages, including signals, data, or messages transmitted through text chat, instant messaging, and e-mail. Any one of networks 30*a-c* may be implemented as a local area network (LAN), wide area network (WAN), global distributed network such as the Internet, an intranet, an extranet, or any other form of wireless or wireline communication network. In addition, communication networks in accordance with various embodiments may include any number of communication platforms 50.

In an embodiment, user stations 20*a-f* are elements compatible with Session Initiation Protocol (SIP) and include hardware and/or software operable to receive and to transmit data directly or indirectly. The term "user station" encompasses a myriad of potential devices and infrastructure that may benefit from the operations of communication system 10. User stations 20*a-f* may include a Personal Digital Assistant (PDA), a cellular telephone, a standard telephone that may be coupled to a personal computer, an IP telephone, a personal computer, a laptop computer, a mobile telephone, or any other suitable device or element (or any appropriate combination of these elements) that is operable to receive data or information. FIG. 1 illustrates only one set of example devices that may be used within communication system 10. The present invention is replete with numerous alternatives that could be used to facilitate the operations of communication system 10.

Communication platform 50 facilitates communication among users and maintains information on users of communication system 10. For example, communication platform 50 may facilitate connecting user station 20*a* which may be using H.323 with user station 20*f* which may be using SIP. Further, communication platform 50 may monitor user stations of the communication system and transmit information regarding the status of various user stations and/or calls. Accordingly, communication platform 50 might be a proxy server operable to send registrations, invitations to sessions, and other requests. In other embodiments, communication platform 50 is any suitable component (e.g. a gateway, a switch, a router, a bridge, a state machine, a processor, etc.) that is operable to interface with endpoints/end-user.

Software and/or hardware may reside in communication platform 50 in order to achieve the teachings of the VLC feature of the present invention. Due to its flexibility, communication platform 50 may be equipped with or include any suitable component, device, application specific integrated circuit (ASIC), processor, microprocessor, algorithm, read only memory (ROM) element, random access memory (RAM) element, erasable programmable ROM (EPROM), electrically erasable programmable ROM (EEPROM), field programmable gate array (FPGA), or any other suitable element or object that is operable to facilitate the operations thereof. Considerable flexibility is provided by the structure of communication platform 50 in the context of communication system 10 and, accordingly, it should be construed as such.

Referring specifically to communication network 30*a*, as illustrated in FIG. 1, communication network 30*a* is a packet switched networked. Accordingly, communication in communication network 30*a* occurs using packets, cells, frames, or other portions of information. Communication network 30*a* includes a plurality of segments 40 and nodes 41 that couple user stations 20*a-f* with communication platform 50 and communication networks 30*b*-30*c*. Segments 40 may include a broadband access link, digital subscriber (DSL) link, a T1 link, a fiber optic link, and/or a wireless link. Nodes 41 may include any combination of network components, gatekeepers, communication platforms, conference bridges, routers, hubs, switches, gateways, user stations, or other hardware, software, or embedded logic implementing any number of communication protocols that allow for the exchange of packets in communication system 10. It should be noted that communication network 30*a* may include any number and combination of segments 40, nodes 41, or user stations 20*a*-20*f*.

As it relates to the invention, communication network 30*a* is functional to employ voice communication protocols that allow for the addressing or identification of user stations, nodes, and/or communication platforms coupled to communication network 30*a*. Technology that allows telecommunication information to be transmitted over an IP network may comprise Voice over IP (VoIP), or simply Voice over Packet (VoP). In the illustrated embodiment, user stations 20*a*-20*f* and communication platform 50 include IP telephony capabilities allowing them to participate in and/or monitor IM, audio, video, and other multimedia communication sessions. IP telephony devices may include telephones, fax machines, computers running telephony software, nodes, gateways, wired or wireless devices, hand held PDAs, or any other device capable of performing telephony functions over an IP network.

In an embodiment, communication system 10 transmits data using session initiation protocol (SIP). SIP is an application layer control protocol that can establish, modify, and terminate multimedia sessions (conferences) such as Internet telephony calls. SIP works independently of underlying transport protocols and without dependency on the type of session that is being established. Further, SIP may be used in creating a shared line environment in which several IP phones may share a single line. A communication device that is part of a shared line may receive status updates, sometimes referred to as remote state notifications, that let all the devices sharing the line know what all the other devices are doing. It should be noted that the SIP control protocol is used by way of example and not meant to limit the scope of the present invention.

Figure 2:
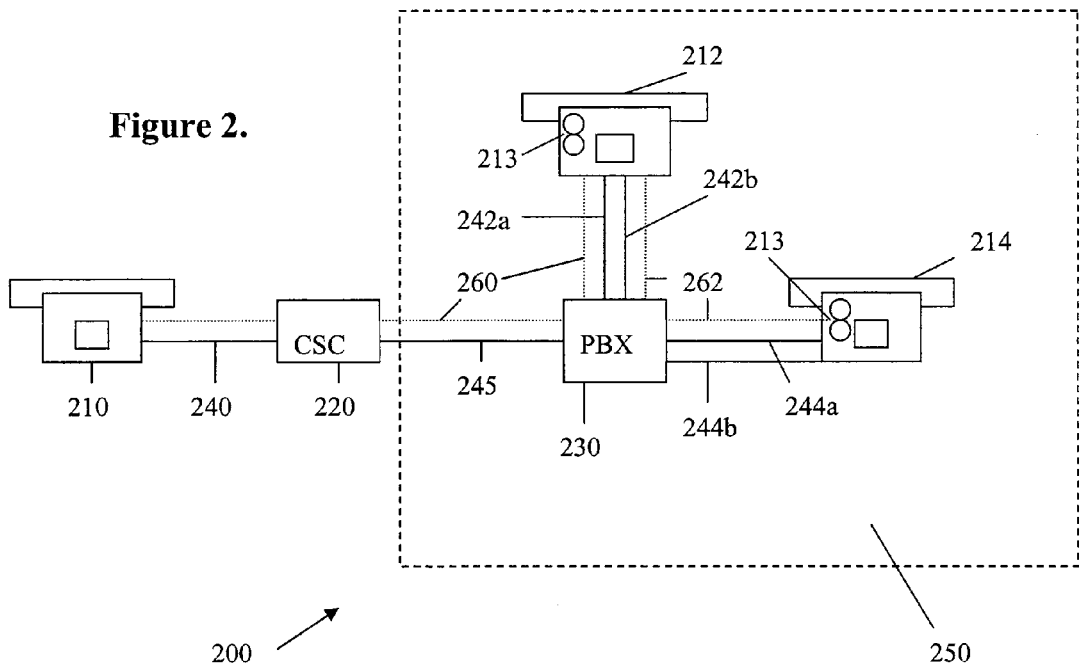
FIG. 2 illustrates a simplified block diagram of a call operation in a circuit switched communication network.

To illustrate the features of the present invention, it is useful to provide some overview of an analog trunk in a circuit switched network, specifically a key telephone system. FIG. 2 is a simplified block diagram of a call operation in key system 200. Key system 200 includes a plurality of telephone 210, call switching center (CSC) 220, and business network 250. Business network 250 comprises telephone 212, telephone 214, and private branch exchange (PBX) 230. Business network 250 can be any shared line environment such as an office or home.

CSC 220 is an external center operable to connect telephone 210 with telephones 212 and 214 in business network 250 when a communication session is initiated. More specifically, CSC 220 is a telephone exchange operable to complete a circuit between telephones in key system 200 to facilitate a communication session. Similarly, PBX 230 is operable to complete a circuit between telephones within business network 250 as well as with CSC 220.

As illustrated in FIG. 2, telephone 210 is connected to CSC 220 by line 240. Telephone 212 is connected to PBX 230 by shared lines 242a-b. Telephone 214 is connected to PBX 250 by share lines 244a-b. PBX 230 is connected to CSC 220 by line 245. While line 245 is depicted as a single telephone line, it may represent a plurality of telephone lines, thereby granting business network 250 greater communication capacity. As is standard in a shared line environment, shared lines 242a-b and 244a-b are connected such that line 242a operates over the same channel as line 244a, and line 242b shares a channel with line 244b.

In a circuit switched network, each line enables a telephone to enter into a communication session. Thus, telephone 212 and telephone 214 are operable to enter into two communication sessions at any given time, whereas telephone 210 is limited to a single communication session. Because telephones 212 and 214 have multiple lines connecting each to PBX 230, telephones 212 and 214 have a user interface with an indicator 213 (light) corresponding to a particular line. When a particular line is active (in use) the indicator 213 will notify a user so that the user is able to select an inactive line when placing a call.

A circuit switched communication network requires a reserved circuit for the duration of a communication session. For instance, when a user at telephone 210 sends a call request to a user at telephone 212, circuit 260 through line 240, CSC 220, line 245, PBX 230, and lines 242a and 244a are reserved. Because lines 242a and 244a are reserved, an indicator corresponding to lines 242a and 244a on telephones 212 and 214 will become active. If a user at telephone 212 accepts the call request by answering the telephone, a communication session is established and circuit 260 will be reserved until either the user at telephone 210 or user at telephone 212 decides to terminate the session by hanging up the telephone. If a user at telephone 212 decides to reject the call request by not answering, then circuit 260 remains reserved, and the indicator corresponding to line 242a and 244a remains active, until the user at telephone 210 decides to terminate the call request. Therefore, circuit 260 is reserved from the time a call request is sent through the duration of the call.

Once a circuit is reserved, it is unavailable for other communication sessions until it is released. A circuit is released when either a call request is terminated or a communication session is terminated. For instance, when circuit 260 is reserved, line 240 and line 242a and 244a are unavailable to establish a circuit for another communication session. Thus, because line 240 is reserved for circuit 260, a user at telephone 214 could not establish a communication session with the user at telephone 210 over line 244a when the call has been answered by telephone 212.

In a shared line environment, a destination telephone or a telephone making an outgoing call is referred to as a call trunk. Thus, in the above described example, telephone 212 is the call trunk. In a call transfer operation in a circuit switched network for a shared line, a call trunk remains active even though the telephone might be on hook. To illustrate, when a communication session between telephone 210 and telephone 212 over circuit 260 is established, the user at telephone 212 can transfer the communication session to telephone 214. This is done by creating a circuit 252 through line 242b, CSC 230, and line 244b. Once circuit 262 is established, a user at telephone 210 can communicate to a user at telephone 214 via circuits 260 and 262. Because both line 242a and line 242b are reserved, telephone 242 is unable to receive and send calls even though a user at telephone 242 may have hung up the phone. This is because the circuit connecting telephone 210 and 214 runs through telephone 212. Accordingly, telephone 212 will be unable to participate in a new communication session (i.e. send and receive calls) until the communication session between telephone 210 and telephone 214 is terminated, thereby releasing the reservations of circuits 260 and 262.

A call forwarding function operates in a similar manner as the call transfer function. The primary distinction is that in call forwarding, the user at the transferring/forwarding telephone does not accept the call request, but rather manually or automatically sends the call to another telephone. To illustrate, call forwarding is performed when a user at telephone 210 sends a call request either manually or automatically to a user at telephone 212 and instead of accepting the request, by answering the telephone, the user at telephone 212 sends the request to telephone 214. In this case both circuit 260 and circuit 262 will be reserved as the communication session initiated with a communication session request to telephone 212. Thus, as with call transferring, call forwarding also prevents telephone 212 from participating in a new communication session until circuit 250 or circuit 252 is released by terminating the communication session between telephone 210 and telephone 214.

For purposes of teaching and discussion, it is useful to distinguish IP telephony from a circuit switched system. The primary distinction is that IP phones operate over a packet switched network. A packet switched network transmits data by placing the data in packets and sending each packet individually to the selected destination, along one or more communication paths. Unlike a circuit switched network (like a key system), a dedicated circuit is not required for the duration of a call or fax transmission. Thus, there is no direct relationship between the physical wiring and the number of lines that an IP phone supports. For instance, IP phones based on 100 Mbps Ethernet connections could theoretically support hundreds of phone lines. How many lines an IP phone supports is instead determined solely by the design of the phone's user interface, not the physical connectivity to the system equipment cabinet. Thus, if telephone 212 in FIG. 2 was a standard IP phone, a user at telephone 212 would not be prevented from entering into a new communication session upon transferring or forwarding a call. Accordingly, in standard VoIP communications there is no call trunk.

To highlight this distinction, assume an incoming call is sent to phone number XXX-XXX-5001 ("extension 5001") which is a phone number associated with a phone in a packet switched network. If the phone associated with extension 5001 were to transfer the call to phone number XXX-XXX-6000 ("extension 6000"), then extension 5001 would become inactive. Conversely, if this communication session occurred in a circuit switched network, extension 5001 would be reserved until the user at extension 6000 or the original incoming caller terminated the communication session.

Because IP phones are operable to support numerous communication channels through a single connection, a special protocol is necessary to restrain phones in a packet based network if they are to function as an analog trunk. This is accomplished by creating a virtual line which emulates a telephone line in a circuit switched telecommunication environment.

FIGS. 3-6 illustrate the implementation of a virtual line by communication platform 50 of FIG. 1. While the VLC feature is illustrated using SIP, it should be apparent to one skilled in the art that the feature could be implemented using a multitude of other communication session protocols such as H.323.

Figure 3:
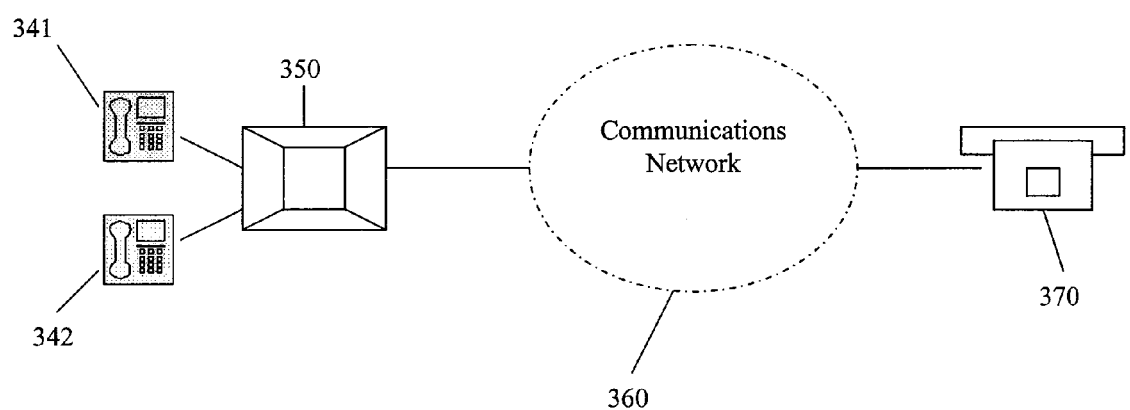
FIG. 3 illustrates a simplified block diagram of a communication platform of the present invention.

In FIG. 3, communication platform 50 of FIG. 1 is depicted in a simplified example of a communication network. Connected to one end of communication platform 350 are IP phones 341 and 342. IP phones 341 and 342 are able to communicate with telephone 370 via communication platform 350 which is connected to communication network 300.

As illustrated in FIG. 3, communication platform 350 is operable to function as a proxy server. In particular, communication platform 350 is functional to send registrations, invitations to sessions, and other requests in a SIP environment. Although communication platform 350 might simply be a proxy server, it may also be incorporated into another network component (e.g. gateway, a switch, a router, a bridge, a state machine, a processor, etc.) that is operable to interface with user stations and end-users.

It should be noted that communication network 360 may include several separate but inter-connected communication networks. For example, in connecting communication platform 350 to telephone 370, communication network 360 may comprise a LAN that couples communication platform 350 to the Internet, which in turn is coupled to a public switched telephone network PSTN that services telephone 370.

Communication platform 350 supports communications through IP phone 341 and IP phone 342. Because incoming and outgoing calls to and from IP phones 341 and 342 pass through communication platform 50, communication platform 50 is operable to regulate their communication capabilities. Specifically, communication platform 50 is operable to maintain a plurality of proxy states for each incoming and outgoing call. Thus, when a call is made to, or sent by, an IP phone serviced by communication platform 350, communication platform 350 establishes a proxy state for the communication. For instance, if a call is made from telephone 370 to extension 5001 which services either one or both of IP phones 341 and 342, communication platform 350 will manage the call by assigning various proxy states to the communication channel associated with extension 5001.

There are at least four possible proxy states for the VLC feature that communication platform 350 may assign to a channel: 1) Channel Inactive; 2) Channel Active; 3) Line Seized; and 4) Line Seized—Channel Active. Different proxy states correspond to different communication capabilities of IP phones 341 and 342. When extension 5001 has a Channel Inactive proxy state, the line is free and incoming calls can be received and outgoing calls can be made. When a channel is active, incoming calls to that extension cannot be received and an attempt to make an outgoing call will deliver a remote-in-use prompt. The Line Seized and Line Seized—Channel Active proxy states are used to indicate that a particular call is owned by a given extension, helping to resolve glare between incoming and outgoing calls plus contention between shared line appearances for the same line. These proxy states are relevant to call forwarding and call transfer functions.

Figure 4:
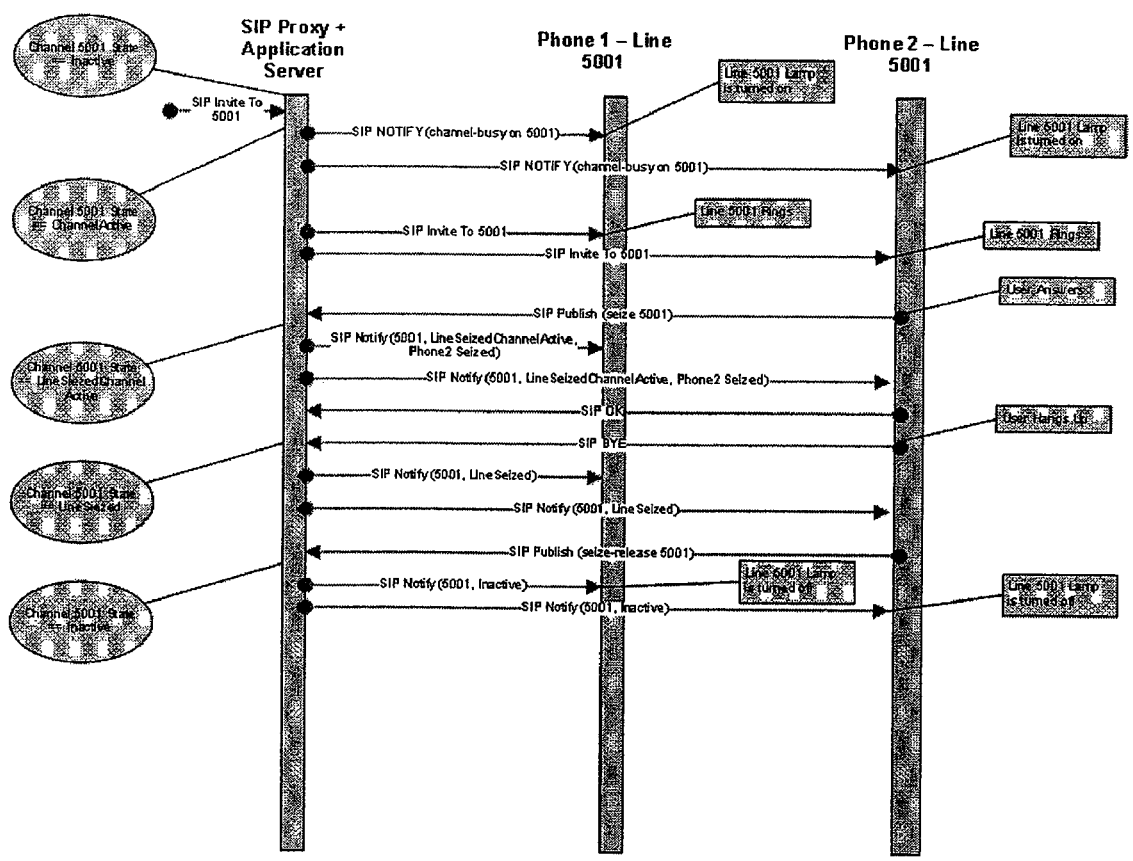
FIG. 4 illustrates a simplified call flow diagram of an implementation of a virtual line channel for an incoming call.

FIG. 4 illustrates the VLC function for an incoming call in the communication network illustrated in FIG. 3. The communication session of FIG. 4 is initiated when a user at telephone 370 places a call to extension 5001 which is one of a multitude of telephone numbers associated with IP Phones 341 and 342. The call travels through communication network 360 to communication platform 350.

At the outset, the proxy state maintained by communication platform 350 for extension 5001 is Channel Inactive. Accordingly, a telephone connected to extension 5001 is capable of receiving and sending calls over the channel. Upon receiving the incoming call, communication platform 350 changes the proxy state for the channel associated with extension 5001 ("channel 5001") to Channel Active and sends a SIP channel busy NOTIFY message to IP phones 341 and 342. Though extension 5001 has only one virtual channel, each IP phone 341 and 342 receives the NOTIFY message as there are multiple appearances of extension 5001 on the different phones and each appearance is notified when the VLC proxy state changes. In response to the NOTIFY message, a user interface lamp on IP phones 341 and 342 is switched on. The lamp serves to indicate to a user that extension 5001 is in a Channel Active proxy state.

After sending the SIP NOTIFY message, communication platform 350 sends a SIP INVITE message to each of IP phones 341 and 342. Upon receiving the INVITE message, IP phones 341 and 342 will begin to ring. It should be noted that the NOTIFY and INVITE messages are sent nearly simultaneously by communication platform 350. Because the INVITE and NOTIFY messages are sent in close proximity, it is unlikely that users at IP phones 341 and 342 will be able to recognize the line active lamp turning on prior to the phone ringing. The reason for sending the INVITE and NOTIFY messages separately will become more apparent when the call forward and transfer functions are explained.

In the illustration of the VLC function represented in FIG. 4, a user at IP phone 342 answers the call. IP phone 342 attempts to seize channel 5001 by sending a SIP PUBLISH message to communication platform 350. In response to receiving the SIP PUBLISH message, communication platform 350 changes the proxy state of channel 5001 to Line Seized—Channel Active and sends a SIP NOTIFY message to each IP phone 341 and 342 indicating the proxy state change with an identity of the IP phone successful in seizing the line. The NOTIFY message indicates that the seize was successful and which IP phone captured the seize. IP phone 342 may send a SIP OK message back to communication platform 350 to indicate that the PUBLISH message was successfully delivered. It should be noted that FIG. 4 merely serves to illustrate the VLC feature. A user at IP phone 341, after a successful seizing of line 5001, may now answer the call.

Once channel 5001 is seized, the user interface lamp associated with extension 5001 will remain on until the seize is released. Thus, the interface lamp is on from the time a SIP channel busy NOTIFY message is received until the communication session is terminated. This is true for both IP phone 341 and IP phone 342 even though only IP phone 342 is involved in the communication session. Further, if a user at IP phone 341 attempts to initiate a communication session over channel 5001 while the line is seized, the user will be prompted with a remote-in-use signal.

A seize is released when IP phone 342 sending a PUBLISH seize-release message. This typically occurs when the user hangs up the phone, indicating a termination of the communication session between IP phone 342 and telephone 370. A communication session is terminated by hanging up the phone. Thus, when a user at IP phone 342 hangs up, a SIP BYE message is sent to communication platform 350. In response to the SIP BYE message, communication platform 350 sends a SIP NOTIFY message to IP phones 341 and 342 indicating that the proxy state for channel 5001 is now Line Seized. IP phone 342 sends a SIP Publish message to communication platform 350 to release the seize. In response to the SIP PUBLISH message, communication platform 350 sends a SIP NOTIFY message indicating that channel 5001 is inactive. Upon receiving the SIP NOTIFY message, the lamp on IP phones 341 and 342 associated with extension 5001 will turn off. At this point, calls may be sent to and from extension 5001. It should be noted that while the flow diagram in FIG. 4 illustrates that the SIP BYE message is sent before the SIP PUBLISH message, reordering of the messages is within the scope of the invention.

Figure 5:
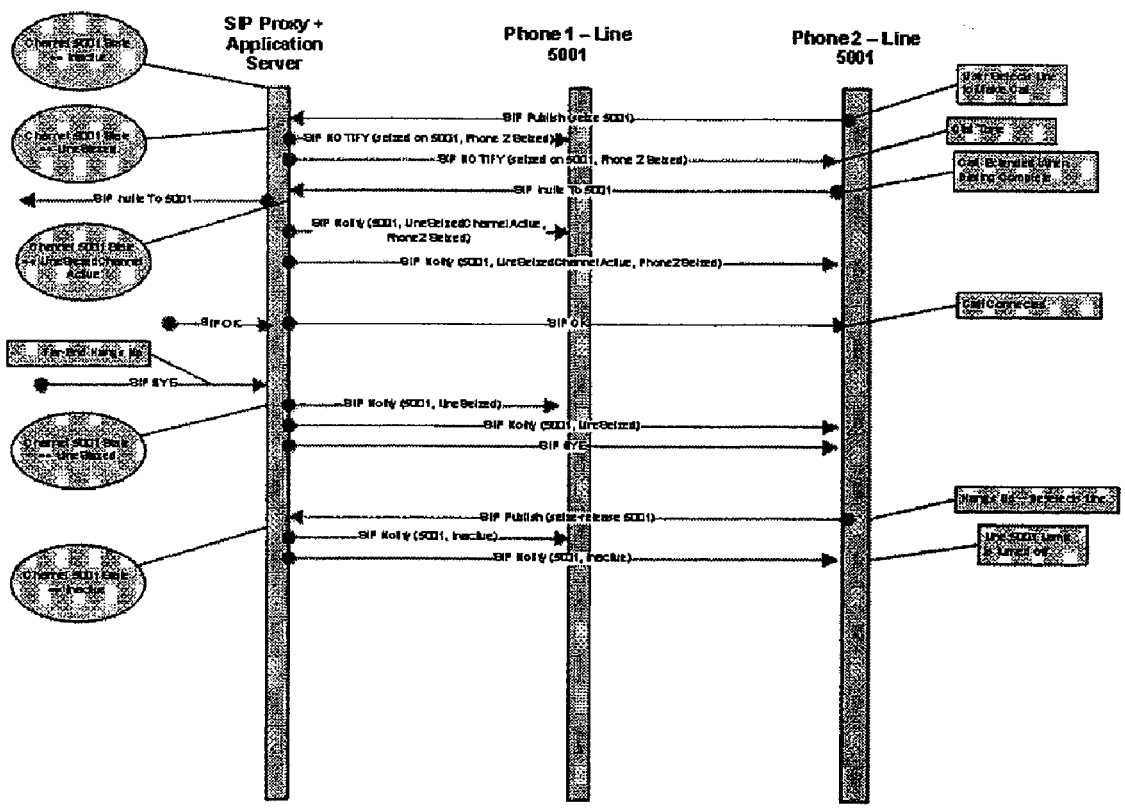
FIG. 5 illustrates simplified call flow diagram of an implementation of a virtual line channel for an outgoing call.

FIG. 5 is a flow diagram of an outgoing call in the communication network. At the outset, the proxy state for channel 5001 is Channel Inactive. When a user over IP phone 342 goes off hook, or selects line 5001 to initiate a call, a SIP PUBLISH message is sent to communication platform 350 to seize the line. In response, communication platform 350 changes the proxy state for channel 5001 to Line Seized and returns a SIP NOTIFY message to each IP phone 341 and 342 indicating that the seize is granted and the identity of the seizing IP phone. Upon receiving the NOTIFY message, IP phone 342 will receive a dial tone and both IP phone 341 and 342 will turn on the lamp indicating extension 5001 is active.

A user will then place a call by dialing a number. Once the call reaches communication platform 350, the proxy state for channel 5001 is changed to Line Seized—Channel Active. Once the proxy state is changed to Line Seized—Channel Active, the VLC function operates in the same manner as the incoming call illustrated in FIG. 4. FIG. 5, however, illustrates the situation where a user at telephone 370 hangs up prior to the user at IP phone 342. In this situation, a SIP BYE message is sent to communication platform 350. In response to the external SIP BYE message, communication platform 350 changes the proxy state of channel 5001 to Line Seized, forwards the SIP BYE message to IP Phone 342, and sends out a SIP NOTIFY message to each P phone 341 and 342 indicating the proxy state change to channel 5001. Once the user at IP phone 342 hangs up, a SIP PUBLISH message is sent to communication platform 350. Upon receiving the SIP Publish message, communication platform 350 changes the state of channel 5001 to Channel Inactive and releases a SIP NOTIFY message to each IP phone 341 and 342 indicating the state change. In response to the SIP NOTIFY message, the lamp on IP phones 341 and 342 associated with extension 5001 will turn off.

The flow diagrams in FIG. 4 and FIG. 5 assume a successful line seize when answering and/or placing a call. There are two situations where communication platform 350 may return a SIP NOTIFY message indicating that the seize was not granted. The first is when there is an incoming call in a shared line environment and multiple users attempt to answer. In this situation, the first SIP PUBLISH message to reach communication platform 350 is granted the seize. Thus, the other phones will receive a SIP NOTIFY message indicating the seize was not granted and a remote-in-use signal is provided.

The second situation occurs when there is glare over channel 5001. Glare refers to the situation where there is a collision between incoming and outgoing calls. Because an analog trunk in a circuit switched network cannot simultaneously receive an incoming call and place an outgoing call, the VLC feature must prevent a user at an IP phone from seizing a channel that has become active from an incoming call. This situation is handled by granting control over the channel to the first call (incoming or outgoing) that reaches the communication platform. For example, if an incoming call arrives at communication platform 350, thus changing the proxy state of line 5001 to Channel Active, prior to the seize request for an outgoing call, then communication platform 350 will deny the seize request for the outgoing call. Thereafter, communication platform will send a SIP INVITE message and the phone will start ringing. By contrast if either of IP phones 341 and 342 goes off hook and the communication platform 350 receives the SIP PUBLISH message prior to receiving the incoming call, then a seize is granted to the IP phone.

Figure 6:
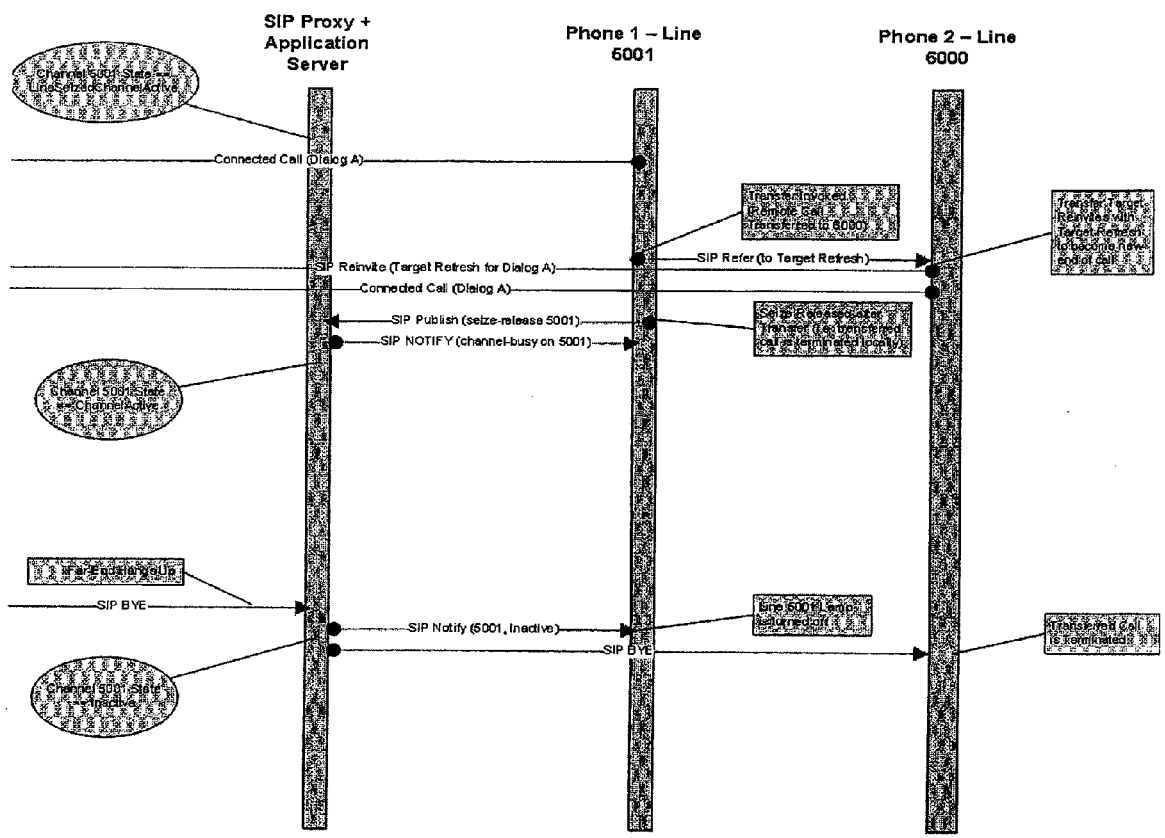
FIG. 6 illustrates a simplified call flow diagram of an implementation of the virtual line channel feature when a call is transferred.

FIG. 6 is a flow diagram of the operation of the VLC during a call transfer from a channel 5001 to an extension 6000. At the outset, a communication session over channel 5001 between IP Phone 342 and telephone 370 is in progress. Accordingly, the proxy state for channel 5001 is Line Seized—Channel Active. Next, the call is transferred from channel 5001 to extension 6000 which is accessible by IP phone 341. In a standard VoIP system, once IP phone 342 hangs up, channel 5001 would be cleared and accessible to both incoming and outgoing calls. By contrast, the VLC feature holds channel 5001 in a Channel Active proxy state until IP phone 341 or telephone 370 terminates the call. Specifically, when IP phone 342 hangs up after transferring the call to channel 6000, a SIP PUBLISH message indicating that the seize on channel 5001 was released is sent to the communication platform 350. In response, communication platform 350 sends a SIP NOTIFY message to IP phone 342 indicating that the proxy state for channel 5001 changed to Channel Active. Because channel 5001 is in an active state, extension 5001 will not be available for sending or receiving calls. Therefore, channel 5001 emulates an analog trunk in a circuit switched communication network. When the communication session between telephone 370 and IP phone 341 terminates, communication platform 350 sends a SIP Notify message to IP phone 342 extinguishing the associated lamp, indicating that extension 5001 is now in a Channel Inactive state and ready for any incoming or outgoing calls.

Call forwarding may work in a somewhat similar fashion in that extension 5001 will have a Channel Active state associated with it when the call is manually or automatically forwarded to another extension upon establishment of the communication session. Extension 5001 will return to a Channel Inactive state when the communication session is terminated.

It is important to note that the states and steps in FIGS. 4-6 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communication capabilities, data processing features and elements, suitable infrastructure, and any other appropriate software, hardware, or data storage objects may be included within communication system 30 to effectuate the tasks and operations of the elements and activities associated with executing the VLC feature.

Although the present invention has been described in detail with reference to particular embodiments, it should be understood that various other changes, substitutions, and alterations may be made herein without departing from the spirit and scope of the present invention. For example, although the present invention has been described with reference to a number of elements included within communication system 10, these elements may be combined, rearranged, or positioned in order to accommodate particular routing architectures or needs. In addition, any of these elements may be provided as separate external components to communication system 10, communication platform 50, or each other where appropriate. In addition, while the foregoing discussion has focused on SIP, any other suitable session protocol may benefit from the teachings provided herein. The present invention is not confined to the SIP platform.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for implementing a virtual line channel in a packet switched network, comprising
    establishing a packet communication session between a first station and a second station;
    reserving a virtual line channel associated with the communication session;
    maintaining the reservation of the virtual line channel while the communication session is active.
2. The method of claim 1, further comprising:
    transferring the communication session to a different channel associated with a third station;
    maintaining the reservation of the virtual line channel while the communication session is active.
3. The method of claim 1, further comprising:
    determining that the communication session has terminated; and
    releasing the virtual line channel reservation in response to termination of the communication session.
4. The method of claim 1, further comprising:
    forwarding the communication session to a different channel associated with a third station;
    maintaining the reservation of the virtual line channel while the communication session is active.
5. The method of claim 1, wherein reserving the virtual line channel occurs prior to establishing the communication session.
6. The method of claim 1, wherein reserving the virtual line channel occurs in response to an incoming call.
7. The method of claim 1, wherein reserving the virtual line channel occurs in response to the first station going off hook.
8. The method of claim 7, further comprising:
    changing the proxy state in response to reserving the virtual line channel.
9. The method of claim 1, wherein the virtual line channel is associated with the first and second stations.
10. The method of claim 1, further comprising:
    setting a proxy state for the first station.
11. A system for implementing a virtual line channel in a packet based communication network comprising:
    a Internet Protocol telephone;
    a communication platform operably associated with the Internet Protocol telephone, the communication platform operable to reserve a virtual line channel for a communication session involving the Internet Protocol telephone, the communication platform operable to maintain the virtual line channel reservation while the communication session is active.
12. The system of claim 11, wherein the communication platform is operable to transfer the communication session to a different channel away from the Internet Protocol telephone, the communication protocol operable to maintain the virtual line channel reservation for the Internet Protocol telephone while the communication session is active.
13. The system of claim 11, wherein the communication platform is operable to forward the communication session to a different channel away from the Internet Protocol telephone, the communication protocol operable to maintain the virtual line channel reservation for the Internet Protocol telephone while the communication session is active.
14. The system of claim 11, wherein the communication platform reserves the virtual line channel in response to an incoming call.
15. The system of claim 11, wherein the communication platform reserves the virtual line channel in response to the Internet Protocol telephone going off hook.
16. The system of claim 11, wherein the communication platform maintains a proxy state for the Internet Protocol phone.
17. The system of claim 16, wherein the communication platform is operable to change the proxy state in response to a status change in the communication session.
18. The system of claim 16, wherein the proxy state is one of Channel Active, Channel Inactive, Line Seized—Channel Active, or Line Seized.
19. The system of claim 11, wherein the communication platform is operable to determine that the communication session has terminated, the communication platform operable to release the virtual line channel reservation in response to termination of the communication session.
20. The system of claim 11, wherein the communication platform is operable to reserve the virtual line channel prior to establishing the communication session.
21. A computer readable medium including code for implementing a virtual line channel in a packet switched network, the code operable to:
    establish a packet communication session between a first station and a second station;
    reserve a virtual line channel associated with the communication session;
    maintain the reservation of the virtual line channel while the communication session is active.
22. The computer readable medium of claim 21, wherein the code is further operable to:
    transfer the communication session to a different channel associated with a third station;
    maintain the reservation of the virtual line channel while the communication session is active.
23. The computer readable medium of claim 21, wherein the code is further operable to:
    determine that the communication session has terminated; and
    release the virtual line channel reservation in response to termination of the communication session.
24. The computer readable medium of claim 21, wherein the code is further operable to:
    set a proxy state for the first station.
25. The computer readable medium of claim 24, wherein the code is further operable to:
    change the proxy state in response to reserving the virtual line channel.
26. A system for implementing a virtual line channel in a packet switched network, comprising:
    means for establishing a packet communication session between a first station and a second station;
    means for reserving a virtual line channel associated with the communication session;
    means for maintaining the reservation of the virtual line channel while the communication session is active.

27. The system of claim 26, further comprising:
means for transferring the communication session to a different channel associated with a third station;
means for maintaining the reservation of the virtual line channel while the communication session is active.

28. The system of claim 26, further comprising:
means for determining that the communication session has terminated; and
means for releasing the virtual line channel reservation in response to termination of the communication session.

29. The system of claim 26, further comprising:
means for setting a proxy state for the first station.

30. The system of claim 29, further comprising:
means for changing the proxy state in response to reserving the virtual line channel.

* * * * *